(12) United States Patent
Tripathy et al.

(10) Patent No.: US 9,614,894 B1
(45) Date of Patent: Apr. 4, 2017

(54) ON-THE-FLY MEDIA-TAGGING, MEDIA-UPLOADING AND MEDIA NAVIGATING BY TAGS

(71) Applicant: Western Digital Technologies, Inc., Irvine, CA (US)

(72) Inventors: Aurobindo Tripathy, Milpitas, CA (US); Darryl DeLacruz, Sunnyvale, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 195 days.

(21) Appl. No.: 14/230,753

(22) Filed: Mar. 31, 2014

Related U.S. Application Data

(60) Provisional application No. 61/936,254, filed on Feb. 5, 2014.

(51) Int. Cl.
  *G06F 15/16* (2006.01)
  *H04L 29/08* (2006.01)
  *H04L 29/06* (2006.01)

(52) U.S. Cl.
  CPC .............. *H04L 67/06* (2013.01); *H04L 65/60* (2013.01)

(58) Field of Classification Search
  CPC ....................................................... H04L 65/60
  USPC ................................................. 709/218, 219
  See application file for complete search history.

(56) References Cited

U.S. PATENT DOCUMENTS

| | | | |
|---|---|---|---|
| 6,499,054 B1 | 12/2002 | Hesselink et al. | |
| 6,732,158 B1 | 5/2004 | Hesselink et al. | |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,870,282 B2 | 1/2011 | Jonsson et al. | |
| 7,917,628 B2 | 3/2011 | Hesselink et al. | |
| 7,934,251 B2 | 4/2011 | Hesselink et al. | |
| 8,004,791 B2 | 8/2011 | Szeremeta et al. | |

(Continued)

FOREIGN PATENT DOCUMENTS

WO    2005022321    3/2005

OTHER PUBLICATIONS

"ContentDirectory:1 Service Template Version 1.01" for UpnPTM Version 1.0, Contributing Members of the UPnPTM Forum, date Jun. 25, 2002, pp. 1-89.

(Continued)

*Primary Examiner* — Adnan Mirza

(57) ABSTRACT

A media item on a device may be tagged as belonging to one or more groups. The tagged media item may then be loaded to a Media Server, thereby making the tagged and loaded media item immediately sharable amongst several devices. A container for each tag may be created in the Media Server, which container may comprise references to the media tagged by the user. A user may then be presented or provide such tags as navigation cues for navigation within his or her media library of the Media Server, thereby enabling the user to more easily recall where their media items are stored and to provide ready access thereto. Tagging and the process of applying or associating tags to media items may improve recall when users hunt for their media.

25 Claims, 7 Drawing Sheets

(56) References Cited

U.S. PATENT DOCUMENTS

| | | | |
|---|---|---|---|
| 8,078,665 B2* | 12/2011 | Poder | H04L 12/185 709/201 |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,438,210 B2 | 5/2013 | Poder et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 2005/0144195 A1 | 6/2005 | Hesselink et al. | |
| 2005/0144200 A1 | 6/2005 | Hesselink et al. | |
| 2008/0065693 A1 | 3/2008 | Malik | |
| 2012/0036041 A1 | 2/2012 | Hesselink | |
| 2012/0047196 A1 | 2/2012 | Poder et al. | |
| 2012/0265845 A1 | 10/2012 | Shiina | |
| 2012/0272149 A1* | 10/2012 | Lee | H04L 65/4084 715/716 |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |

OTHER PUBLICATIONS

"PicTag—Instant Photo Album & Picture Organzier [App]", www.appannie.com/apps/ios/app/pictag-instant-photo-album/, Oct. 16, 2013, p. 1.

* cited by examiner

ON-THE-FLY MEDIA-TAGGING, MEDIA-UPLOADING AND MEDIA NAVIGATING BY TAGS

CROSS-REFERENCE TO RELATED APPLICATIONS

This application claims benefit of U.S. Provisional Patent Application Ser. No. 61/936,254 entitled "ON-THE-FLY MEDIA-TAGGING, MEDIA UPLOADING AND MEDIA NAVIGATING BY TAGS" filed Feb. 5, 2014, the disclosure of which is incorporated by reference herein in its entirety.

BACKGROUND

Music, video, still images are often created by and stored across many devices that have access to a home network. For example, a particular device (such as a home personal computer, for example) may function as a "Media Server" device that may be configured to serve up, on demand, specific objects from the user's media library. To enable this functionality, the user can be provided the ability to browse the objects stored on the Media Server, select a specific one, and cause it to be appropriately rendered on a device such as, for example, an audio player for music objects, a TV for video content, a monitor for still-images, and the like. The ease at which media content is created, downloaded and shared has contributed, however, to increasing difficulties in categorizing, retrieving and playing, rendering or otherwise enjoying this media content on the user's device of choice.

DETAILED DESCRIPTION

Figure 1:
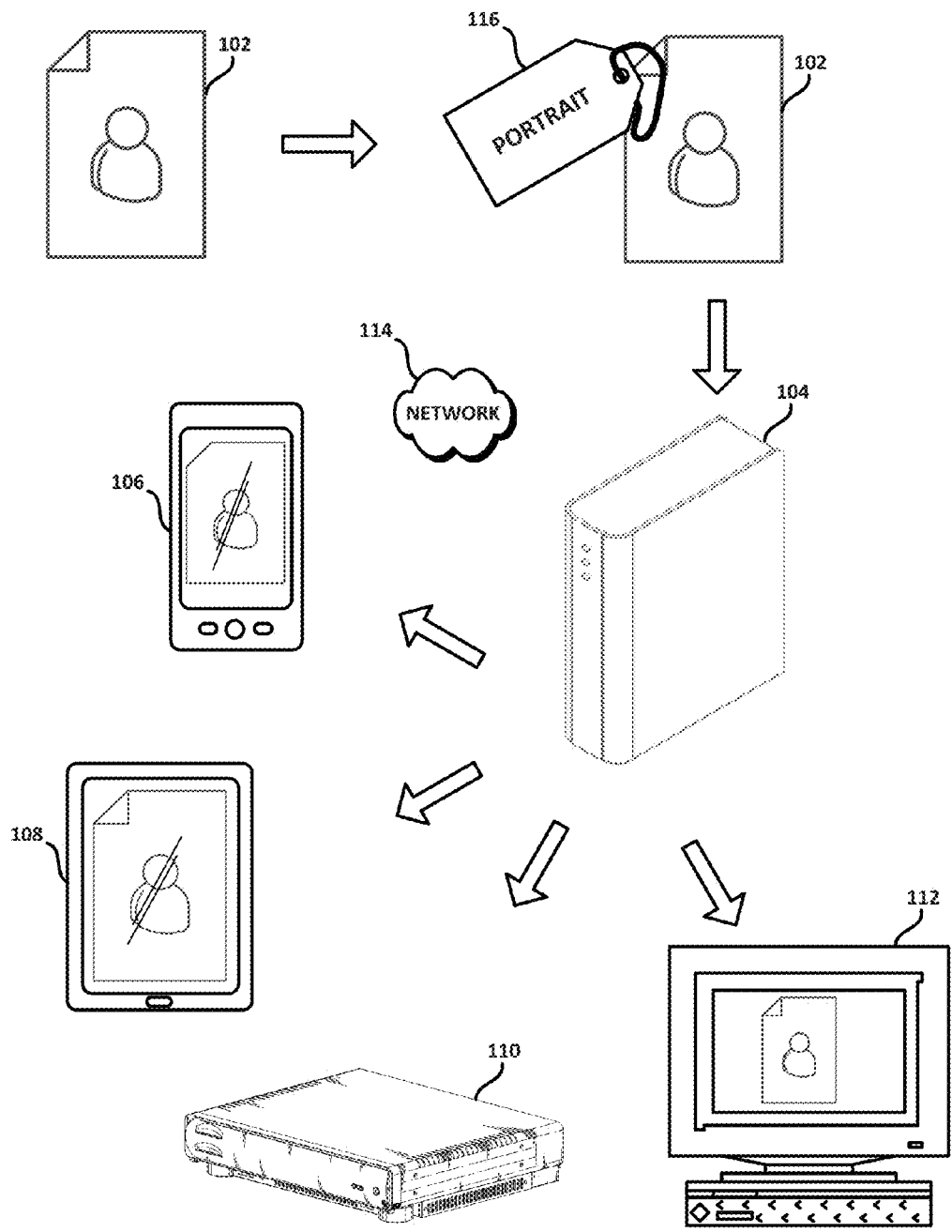
FIG. 1 shows aspects of one embodiment and an exemplary environment in which one embodiment may be practiced.

While amassing content on their mass storage (such as Network Attached Storage (NAS)), some users develop "search anxiety" when they look for specific media items. Some client applications force the user to navigate via strict media type categories such as photos and video and then by folder and subfolder. This forced choice is at odds with users' own memory storage processes, which are more intuitive, thematic, contextual or event-based. Sometimes, the user does not want to distinguish between photos, audio and video. Indeed, users may want to retrieve all of the media associated with a particular time, categorization or event, irrespective of the type of media.

One embodiment may be configured to operate within the framework of the Universal Plug-and-Play (UPnP) specifications, which are available from upnp.org and which are incorporated herein in their entireties. Indeed, one embodiment may utilize one or more protocols and/or Application Program Interfaces (APIs) published in the UPnP specifications. Due to widespread adoption, millions of client devices have been configured to use the UPnP specification. An App on a client device (such as a mobile device or a thin client, for example) may be configured to incorporate one embodiment. Alternatively or in addition, one embodiment may be configured as, and incorporate the functionality of, a Media Server. Moreover, one embodiment may be configured to operate within other standards and/or protocols such as, for example, Digital Living Network Alliance (DLNA), which defines interoperability guidelines to enable sharing of digital media between multimedia devices, media management, discovery and control. The DLNA standard is available from dlna.org and is also incorporated herein in its entirety.

According to one embodiment, a media item (such as, for example, a picture or video clip) on a device may be tagged (by a user or programmatically, for example) as being associated with one or more content groups. The tagged media item may then be loaded to a Media Server (such as, for example, a DLNA media server), thereby making the tagged and loaded media item immediately sharable amongst several devices. It is to be understood that tagging is not to be restricted to the media capture device. Indeed, according to embodiments, tagging may be performed after the media item has been loaded onto a Media Server. Such tagged and loaded media item may be sharable with, accessible to and played/rendered by any DLNA-compatible players such as, for example, televisions (with either native support or coupled to a properly-configured set-top-box), cable box, tablet, personal computer and/or mobile device. On such devices, according to one embodiment, a user may be presented with the aforementioned tags as navigation cues for navigation within his or her media library, thereby enabling the user to see where his or her media items are stored and to more easily find and gain access thereto. In fact, tagging and the process of applying or associating tags to media items may improve recall when users search their libraries for their stored media.

According to one embodiment, a media tag may be configured as a string of one or more words, numbers or symbols. For example, a media tag may be created, selected or generated to have meaning or be otherwise evocative to the user(s). The same tags may be applied across media types. For example, a same tag may be applied to or otherwise associated with photos, videos and audio content. According to one embodiment, more than one tag may be associated with a same media item and more than one media item may be associated with the same tag, thereby creating multiple paths to navigate to and access the same media content across different media types, depending on which tag(s) the user recalls and uses for navigation purposes.

According to one embodiment, a content-group may be created on-the-fly, may be labeled with a (e.g., personalized) tag, and/or may be loaded to one or more media servers, to thereby enable content navigation based at least in part on the tag(s). According to one embodiment, the player or rendering devices need not be modified to play or render tagged media items. Indeed, players and rendering devices, such as DLNA-compatible players or rendering devices, may simply navigate or be controlled to navigate to the desired media item(s), guided by the dynamically created tags across types of related media.

Significantly, one embodiment enables the creation of mixed-media content groups (i.e., groups comprising heterogeneous types of media content such as photos and video) that are associated with the same tag(s), in contrast to the more rigid and strict conventional separation of music, photos, and videos.

One embodiment enables media items to be associated with and described (or suggested by) one or more tags, which enable ready and intuitive navigation thereto using such tags and/or words, strings, numbers or symbols contained within or otherwise associated with those tags.

FIG. 1 shows aspects of one embodiment and an exemplary environment in which one embodiment may be practiced. As shown therein, a photo or other image or graphic file 102 may be tagged, either programmatically or by the user with a tag 116. The tag 116 may be descriptive or suggestive (at least to the user) of the content of the file 102 and/or otherwise logically, temporally, geographically or thematically associated therewith. The thus-tagged file 102 may then be loaded to a centralized location, such as a Media Server such as, for example, a NAS. Thereafter, using the tag 116, a user may navigate to, retrieve and display such tagged image file 102 using devices such as mobile phone 106, tablet computing device 108, Digital Video Recorder (DVR) 110 coupled to a television or computer 112 coupled to network 114.

Figure 2:
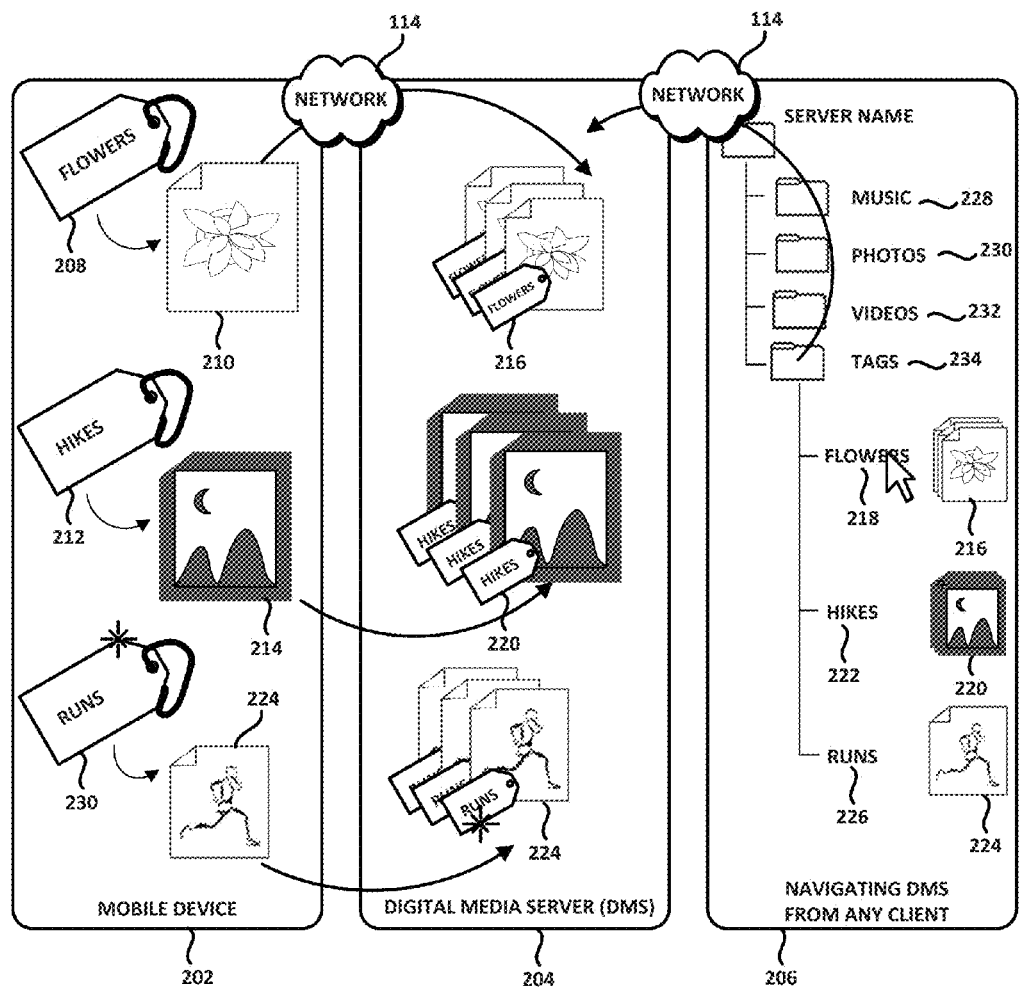
FIG. 2 shows the application of a tag to media items, according to one embodiment.

FIG. 2 shows the application of a tag to media items, according to one embodiment. As shown therein, a mobile device 202 may access a Digital Media Server (DMS) 204 over a network 114. A user (or some programmatic process) may associate a tag 208 to a media item 210, and cause the tagged media item to be stored in a server, such as DMS 204. Several media items may be similarly tagged with the "FLOWERS" tag 208, as shown at 216. Similarly, the user or some programmatic process may associate a tag 212 with a media item 214 and cause the tagged media item to be stored in the DMS 204. Several media items may be similarly tagged with the "HIKES" tag 212, as shown at 220. Likewise, the user or some programmatic process may associate a tag 230 with a media item 224 and cause the tagged media item to be stored in the DMS 204. Several media items may be similarly tagged with the "RUNS" tag 230, as shown at 224. It is to be noted that the process of associating a tag with a media item can take place at the mobile device 202 and/or at the DMS 204. According to one embodiment, the tagged media item (e.g., photo, graphic, image, audio and/or video and/or other forms of media) may be loaded to the DMS 204 which may, according to one embodiment, be configured as a DLNA-compliant DMS.

In the example being developed relative to FIG. 2, if the tag "FLOWERS" 208 associated with the tagged media item already exists (i.e., is known to the DMS 204), the DMS 204 may associate the existing tag 208 with the new media item. Similarly, a media item 214 (e.g., an image or a video) may be tagged with a "HIKES" tag 212 and loaded to the DMS 204. However, as the "RUNS" tag 230 associated with the media item 224 in FIG. 2 is new (e.g., only recently created and at present unknown to the DMS 204), the DMS 204 may create the new tag 224 and thereafter may enable the user to use the newly-created tag 230 to tag other media items, which may then be loaded to the DMS 204. The DMS 204 may then associate a reference to the tagged object 224 with the newly-created tag 230. As suggested above, the tags may be associated with more than one media item and more than one type of media items, such as photos, videos, audio content or any other type of media or non-media file (e.g., a text or spreadsheet file) or content.

The user (or other programmatic process) may, from a client device 206 (such as shown at 106-112 in FIG. 1) coupled to the network 114, navigate to the DMS 204 by its friendly name, such as "My Media Server". The user may then navigate to the predetermined and pre-existing types of media items such as, for example, music 228, photos 230 or videos 232. The user, according to one embodiment, may also navigate his or her stored media items by tags, 234. In this example, the tags include a "FLOWERS" tag 218, a "HIKES" tag 222 and a "RUNS" tag 226. For example, each of the tags 218, 222, 226 may be associated with references (e.g., pointers) to the tagged media items. For example, references 218, 222 and 226 may be implemented as DLNA containers associated with one or more tags and comprising references (e.g., pointers) to tagged media items. For example, a user may navigate to and select a container that is associated with the "FLOWERS" tag 208 (or otherwise navigate to a user interface element associated with the "FLOWERS" tag), thereby requesting that the DMS server 204 fetch any media items tagged with the selected "FLOWERS" tag 208. The DMS 204 need not fetch the actual tagged media items, but may present the user with the media item's metadata, a thumbnail representation thereof and the like, to enable the user to make further selections of which of the media items the DMS 204 is to fetch. The user may then be presented with one or more media items 216 that are associated with the "FLOWERS" tag.

According to one embodiment, the tags 208, 212 and 230 may be applied to any media item, irrespective of the type of media thereof. For example, the "FLOWERS" tag 208 may be associated with media items that are also categorized as "MUSIC" 228, as "PHOTOS" 230 and/or as "VIDEOS" 232. Moreover, the tagged items need not be "media" items at all, as any type of file (such as a spreadsheet, for example) may be tagged and retrieved by tag or by a combination of tags or elements thereof.

Figure 3:
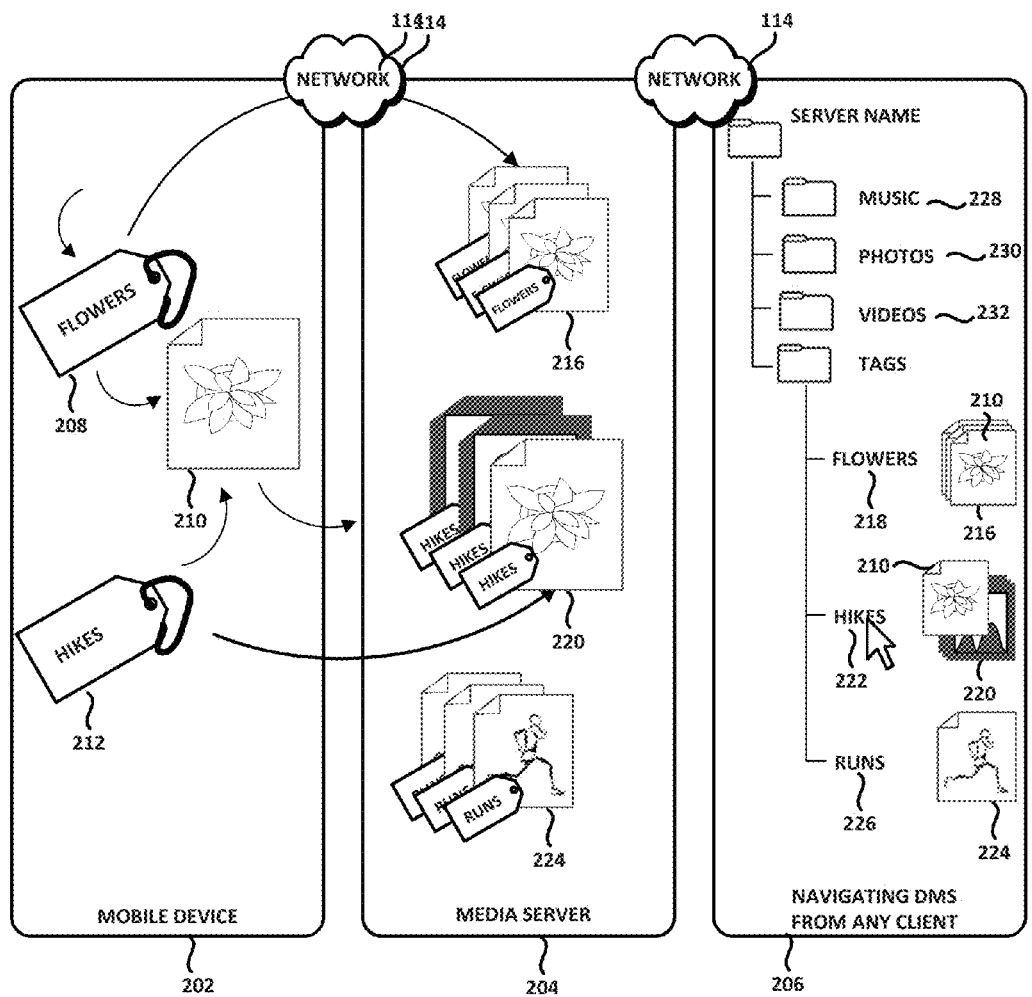
FIG. 3 shows the application of more than one tag to one or more media items, according to one embodiment.

According to one embodiment, more than one media item may be associated with a same tag and more than one tag may be associated with a same media item. FIG. 3 shows the application of more than one tag to a media item, according to one embodiment. As shown therein, both tags 208 and 212 are associated with media item 210 and loaded to DMS 204. Therein, DMS 204 may associate media item 210 with both the "FLOWERS" tag 208 and with the "HIKES" tag 212. In this manner, in the DMS 204, a same media item 210 is associated with two different tags 208, 212. Disparate types of media items (e.g., both videos and photos) may be associated with a same tag. As suggested at 206, a media client 206 may present the user with user interface elements enabling him or her to navigate to and access media items by tags. In this manner, selecting "HIKES" 222 may cause the DMS 204 to retrieve, and present to the user, all or selected media items that were tagged with the "HIKES" tag, irrespective of the media type. Among the media items 220 retrieved by the DMS 204 is the media item 210. This media item 210 may also be selected and consumed (viewed, downloaded or streamed, for example), through the user selecting "FLOWERS" 218. Thus, the user may retrieve media through navigation over separate paths. Selecting "FLOWERS" 218 may cause the DMS 204 to retrieve and present to the user all media items associated with the "FLOWERS" tag 208, including the same media item 210 associated with the "HIKES" tag 212. In this manner, the DMS 204 may enable the user to navigate to a same media item through one, two or more tags, categories, containers or other logical construct.

Figure 4:
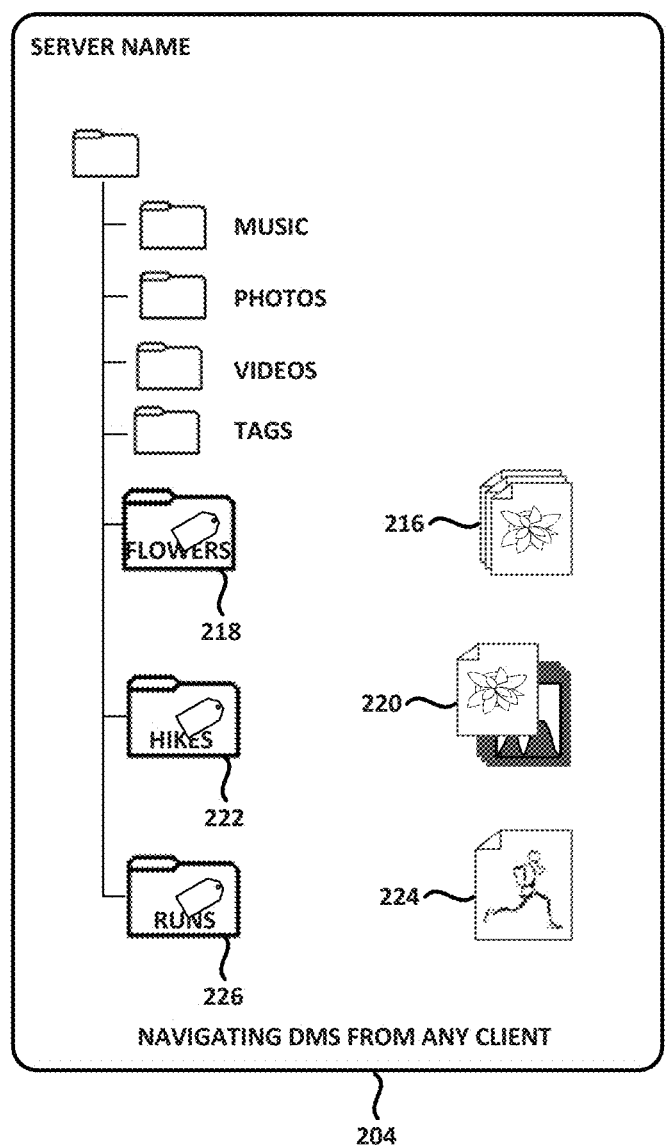
FIG. 4 shows a media hierarchy that a server may present to a client (such as a DLNA client), according to one embodiment.

FIG. 4 shows a media hierarchy that a server may present to a client (such as a DLNA client), according to one embodiment. The embodiment of the user interface of FIG. 4 presents a flat hierarchy to the user. That is, collections of media items associated with a particular tag may be represented in FIG. 4 using folder graphic devices 218, 222 and 226. Such folders 218, 222 and 226 may be represented at the same hierarchical level as the other constituent members of the hierarchy such as MUSIC, PHOTOS and VIDEOS. In this manner, embodiments may improve the media navigation and searching experience of the user while conforming to the existing frameworks, APIs and standards, such as the DLNA standard. Many other implementations and user interfaces are possible.

Figure 5:
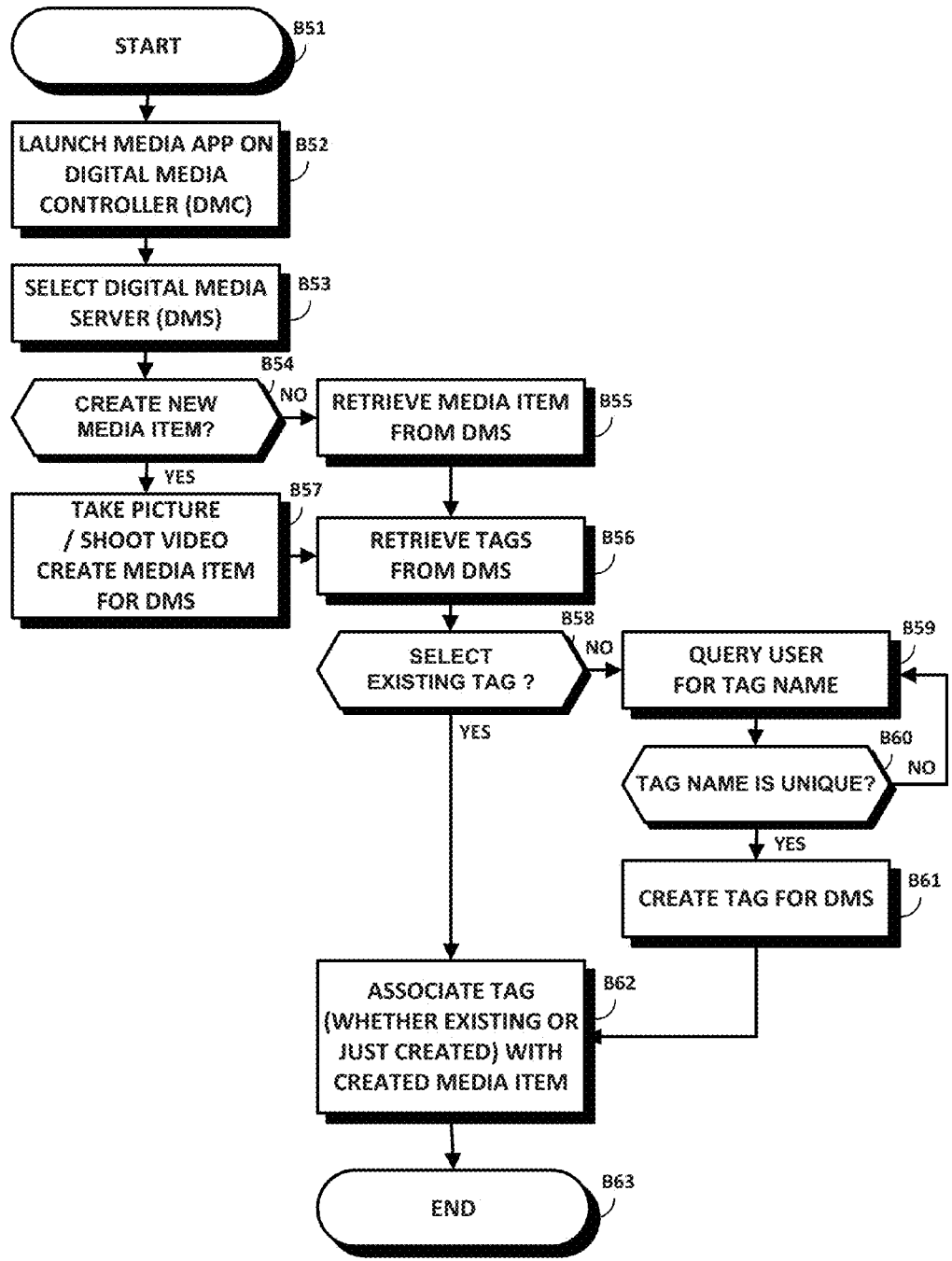
FIG. 5 is a flowchart of a method according to one embodiment.

FIG. 5 is a detailed flowchart of the logic of an App enabling tagging according to one embodiment. As shown therein, the method begins at B51, whereupon a media App embodying aspects of one embodiment may be launched on a Digital Media Controller (DMC) such as, for example, one of the (e.g., mobile) devices shown in FIG. 1 at references 106-112. At B53, a DMS may be selected, in the case wherein more than one DMS is available to the user's device on the network 114. At B54, it may be determined whether a new media item is being or has been created. If not, a media item may be retrieved from the selected DMS, as shown at B55. Thereafter, as shown at B56, tags may be retrieved or accessed from the DMS such as DMS 204 in FIGS. 2-4. If, however a new object or item is created (YES branch of B54), a new media item or item may be created by, for example, taking a picture, shooting video and/or recording audio, as suggested at B57. The method may then proceed from B57 to B56 discussed immediately above, in which tags are retrieved or at least accessed from the DMS. At B58, it may be determined whether to select an existing tag or not. An existing tag may be selected if association of the retrieved or newly-created media item or items with the existing tag would be appropriate or otherwise appeal to the user.

If no existing tag fits the selected or newly-created media item or item or if the user does not select an existing tag for any other reason (NO branch of B58), the DMC may query the user for a new tag name, as suggested at B59. The tag may comprise a suggestive word, phrase, symbol or other characters that may be associated somehow with the existing or newly-created media item or item. A check may thereafter be carried to determine that the newly-created tag is, in fact, unique (i.e., not a repeat of some other existing tag), as shown at B60. If not, the user may be queried for another tag name, whereupon the flow reverts to B59. If the tag name is, in fact, unique (YES branch of B60), the new tag is accepted and created and logged in the DMS as shown at B61. Thereafter, in B62, the tag is associated with the created media item and the association stored in the DMS. B62 may also be carried out, as shown at FIG. 5, if the user (or other programmatic process) selects an existing tag in B58. The method ends at B63.

Figure 6:
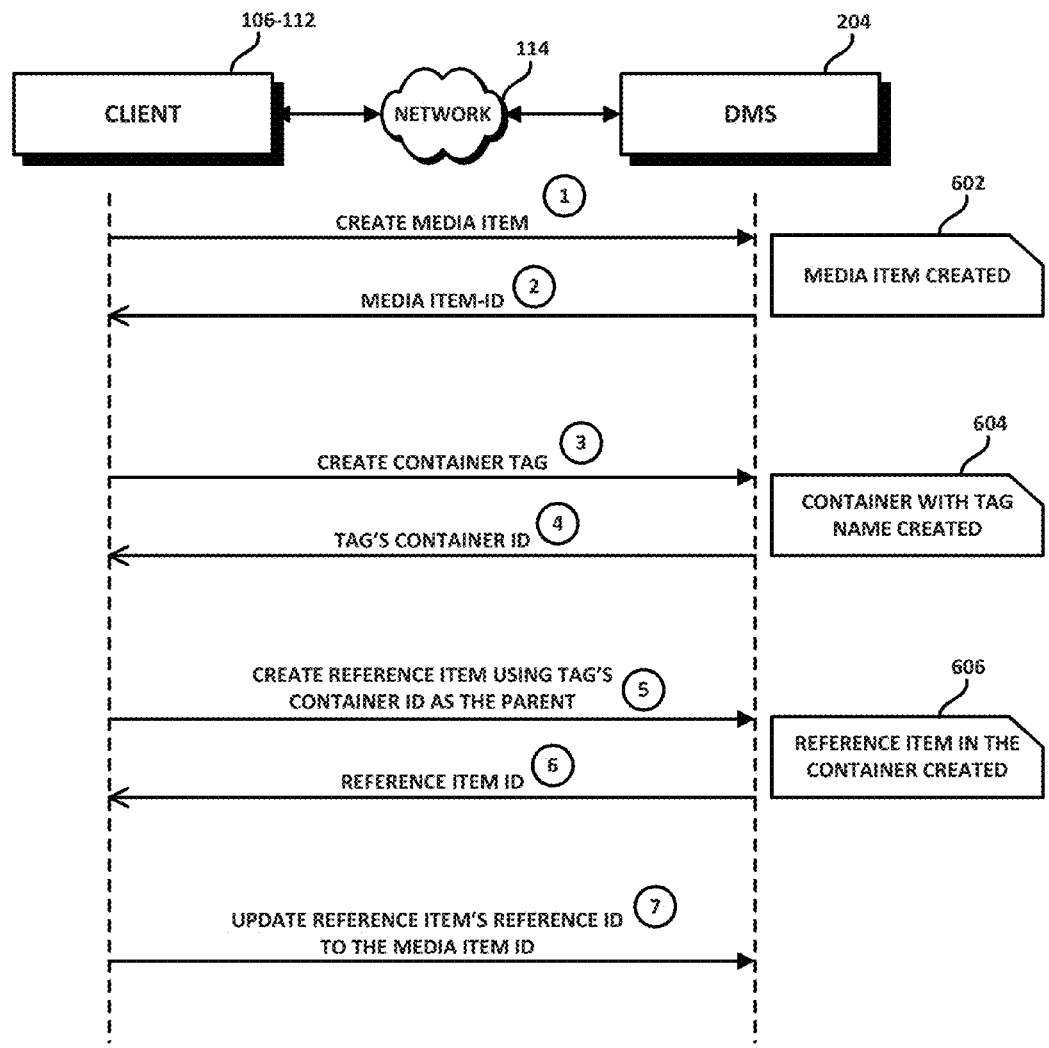
FIG. 6 is a sequence diagram of the manner in which a Digital Media Server (DMS) may be configured to implement one embodiment.

FIG. 6 is a detailed sequence diagram of the manner in which a DMS may be configured to implement one embodiment. The embodiment of FIG. 6, although drawn more specifically to the DLNA implementation, may be readily adapted to other implementations, as those of skill may recognize. As shown in FIG. 6, a client (such as devices 106-112 of FIG. 1) configured according to one embodiment may communicate with a DMS 204 over a network 114 including, for example, a Wide Area Network (WAN) such as the Internet and/or Local Area Network (LAN) such as the user's home network, for example. In the illustrative example of FIG. 6, the user first creates a media item or item. As shown at (1), the created media item may be loaded to the DMS 204 (or even to an external cloud-based storage service configured according to one embodiment), as shown at 602. The DMS 204 may then respond by creating and sending to the client 106-122, a media item or item identifier (ID) associated with the created media item or item 602, as shown at (2). As shown at (3), the user or other programmatic process may create a tag (which may be verified for uniqueness by DMS 204), whereupon the DMS 204 may create a container 604 associated with the just-created tag. A unique ID of the created tag may then be created by the DMS 204 and sent back to the client 106-112, as shown at (4). Alternatively, the user may select an existing tag, whereupon the DMS 204 may return the unique ID of the pre-existing tag to the client 106-122 (not shown in FIG. 6). A reference item may then be created using the tag's container ID as the parent, as shown at (5). An ID of the reference item may then be returned by the DMS 204 to the client 106-122 at (6). Lastly, the reference item's reference ID may be updated to the media item ID returned by the DMS 204 to the client 106-122 at (2). This reference item's reference ID, now updated to the media item's ID may now be stored in the DMS 204. It is the updating of the reference item's reference ID to the media item ID that forms the association between the media item and the container associated with a particular tag. This is because, according to one embodiment, the reference item's reference ID was created using the container ID (which container is associated with a tag) and as the reference item's reference ID was updated to the media item ID.

Figure 7:
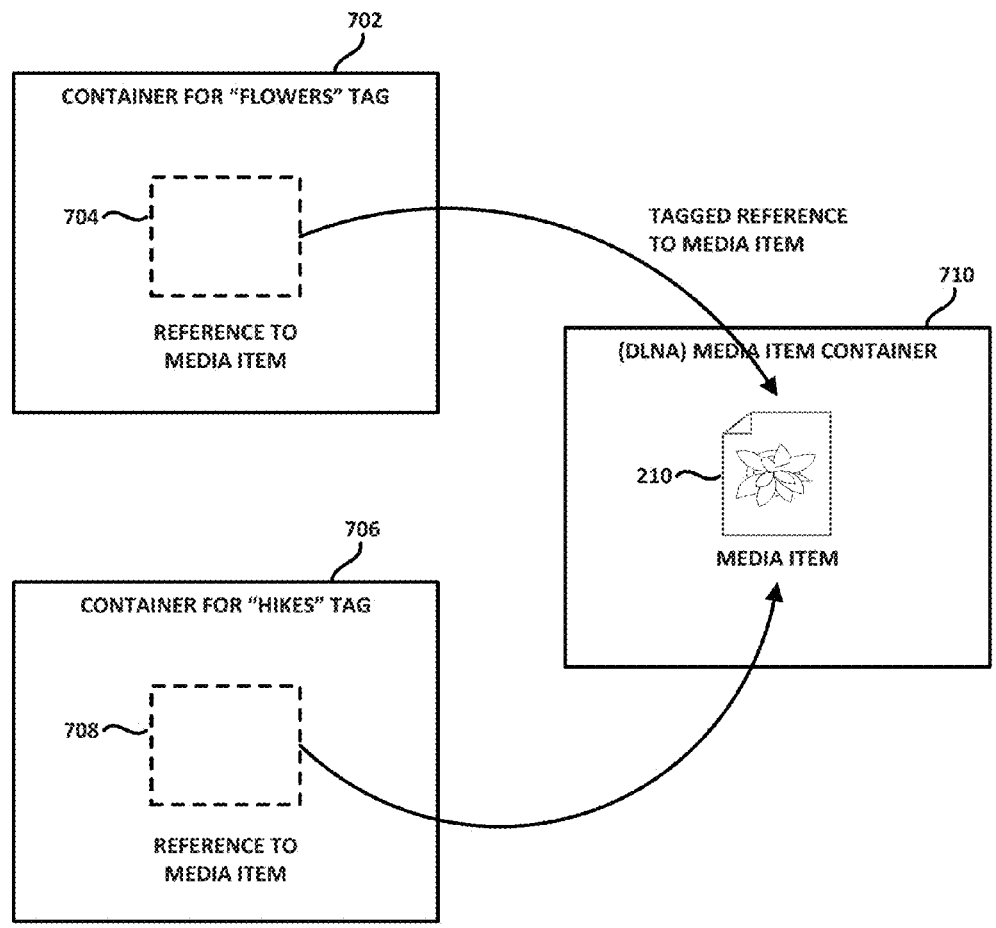
FIG. 7 is a diagram illustrating tags and references to media items associated with such tags, according to one embodiment.

FIG. 7 is a diagram illustrating tag containers and the references to media items or items contained in such tag containers, according to one embodiment. As shown, containers for tags comprise references that refer to or are otherwise associated with media items. According to one embodiment, the containers associated with directories may be stored in their own logical structure. As shown, the container 702 associated with the "FLOWERS" tag may comprise and/or be associated with one or more references (e.g., pointers) 704 to corresponding one or more media items stored at some predetermined location. Similarly, container 706 associated with the "HIKES" tags may comprise and/or be associated with one or more references (e.g., pointers) 708 to corresponding one or more media items stored at some predetermined location. These references 704, 708 may also be associated with a container 710 associated with media items of a specific type such as pictures. The container 710, for example, may be a DLNA container. Therefore, embodiments are compatible with and extend the functionality and usefulness of the existing DLNA infrastructure by allowing navigation and media item retrieval across media types. The media items/items may be stored in the DMS 204 and/or externally thereto.

Significantly, one embodiment brings immediacy to the process of tagging content by creating meaningful tags on-the-fly and later enabling the user or other process to navigate via these same tags. Moreover, embodiments allow for each media item to be associated with more than one (e.g., many) tags, thereby increasing the probability of the user or other process finding the desired media item, irrespective of where it may be physically stored, whether locally within the DMS or externally thereto and accessible via a TCP/IP request. According to one embodiment, several tag-associated pathways may be available for navigation, thereby increasing the likelihood that the user will retrieve the media item or items for which he or she searching. The functionality of the DMS 204 shown and described herein may be readily implemented on a NAS platform and on DLNA-compliant client devices 106-112. According to one embodiment, existing DLNA-compliant DMS apps and DMC apps may be readily configured to implement an embodiment.

Conventionally, users would spend an inordinate amount of time tediously looking for media either by PC-created sub-folders or by date. This process often leads to failure, as the user gives up before locating a desired piece of media. However, according to one embodiment, with user-created tags, users have the ability to organize their media in more natural fashion, using suggestive tags and cross-tagging some or all media items or items with multiple tags. This enables the user to reach their media through several approach paths, nimbly pivoting search strategies using their own previously-created tags. Significantly, the opportunity for serendipitous discovery of relevant media items is increased, as the user uses a combination of intuitive and evocative tags to retrieve previously-stored heterogeneous media items.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the Figs. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

The invention claimed is:

1. A method, comprising:
   providing a first media item;
   sending the first media item to a media server over a computer network for storage in the media server;
   providing a user-selected first tag and associating the provided user-selected first tag with the first media item stored in the media server;
   providing a user-selected second tag and associating the provided user-selected second tag with the first media item stored in the media server, the second tag being different from the first tag;
   connecting to the media server over the computer network using a client device;
   selecting a first or a second content group from among a plurality of content groups displayed by the media server on the client device, the first content group being identified by the user-selected first tag and associated with at least the first media item, the second content group being identified by the user-selected second tag and associated with at least the first media item; and
   accessing the first media item stored on the media server by navigating media stored on the media server that is associated with the selected first content group identified by the first user-selected tag or that is associated with the selected second content group identified by the second user-selected tag.

2. The method of claim 1, wherein providing the first media item comprises one of generating a new media item and selecting an existing media item as the first media item.

3. The method of claim 1, wherein the first media item comprises at least one of image content, video content and audio content.

4. The method of claim 1, wherein providing the first and second tags each comprises at least one of selecting an existing tag and generating a new tag.

5. The method of claim 1, wherein each of the first and second tags comprises a string of one or more words, numbers or symbols.

6. The method of claim 1, wherein at least one of the first and second tags is selected to be evocative of the first media item.

7. The method of claim 1, wherein the media server comprises a Network Attached Storage (NAS).

8. The method of claim 1, wherein at least the media server is Digital Living Network Alliance (DLNA)-compliant.

9. The method of claim 1, further comprising causing the media server to associate the first tag with a second media item that is of a different media type than the first media item, and wherein connecting also accesses the second media item.

10. The method of claim 1, wherein: the first tag is evocative of a first real or perceived characteristic of the first media item, and wherein: the second tag is evocative of a second real or perceived characteristic of the first media item.

11. A method, comprising:
    associating at least a first media item stored in a media server with a first content group identified by a user-selected first tag;
    associating at least the first stored media item with a second content group identified by a user-selected second tag, the user-selected second tag being different than the user-selected first tag; and
    responsive to a request received from a media client over a computer network:
    presenting the first content group for selection and presenting the second content group for selection;
    receiving a selection of the first content group or a selection of the second content group;
    displaying media items associated with the selected first or second content group; and
    enabling connection and navigation to the first stored media item from the displayed media items associated with the selected first or second content groups.

12. The method of claim 11, further comprising:
    receiving the first media item from the media client; and
    storing the received first media item in the media server.

13. The method of claim 11, wherein each of the first and second tags comprises a string of one or more words, numbers or symbols.

14. The method of claim 11, further comprising:
associating a second media item with the first tag, the second media item being of a different media type than the first media item; and
responsive to the request received from the media client, enabling access to the first and second media items by enabling navigation by the media client according to the first tag.

15. The method of claim 11, wherein: the first tag is evocative of a first real or perceived characteristic of the first media item, and wherein: the second tag is evocative of a second real or perceived characteristic of the first media item.

16. An apparatus, comprising:
storage; and
a processor connected to the storage, the processor being configured to:
provide a first media item;
send the first media item to a media server over a computer network for storage in the media server;
provide a user-selected first tag and associating the provided user-selected first tag with the first media item stored in the media server;
provide a user-selected second tag and associating the provided user-selected second tag with the first media item stored in the media server, the second tag being different from the first tag;
connect to the media server over the computer network using a client device;
select a first or a second content group from among a plurality of content groups displayed by the media server on the client device, the first content group being identified by the user-selected first tag and associated with at least the first media item, the second content group being identified by the user-selected second tag and associated with at least the first media item; and
access the first media item stored on the media server by navigating media stored on the media server that is associated with the selected first content group identified by the first user-selected tag or that is associated with the selected second content group identified by the second user-selected tag.

17. The apparatus of claim 16, wherein the processor is further configured to provide the first media item by one of generating a new media item and selecting an existing media item.

18. The apparatus of claim 16, wherein the processor is further configured to provide the first and second tags by at least one of selecting an existing tag and generating a new tag.

19. The apparatus of claim 16, wherein each of the first and second tags comprises a string of one or more words, numbers or symbols.

20. The apparatus of claim 16, wherein the processor is further configured to:
cause the media server to associate the first tag with a second media item that is of a different media type than the first media item; and
access the second media item by navigating according to the first tag.

21. The apparatus of claim 16, wherein: the first tag is evocative of a first real or perceived characteristic of the first media item, and wherein: the second tag is evocative of a second real or perceived characteristic of the first media item.

22. An apparatus, comprising:
storage; and
a processor connected to the storage, the processor being configured to:
associate at least a first media item stored in a media server with a first content group identified by a user-selected first tag;
associate at least the first stored media item with a second content group identified by a user-selected second tag, the user-selected second tag being different than the user-selected first tag; and
responsive to a request received from a media client over a computer network:
present the first content group for selection and presenting the second content group for selection;
receive a selection of the first content group or a selection of the second content group;
display media items associated with the selected first or second content group; and
access the first stored media item from the displayed media items associated with the selected first or second content groups.

23. The apparatus of claim 22, wherein each of the first and second tags comprises a string of one or more words, numbers or symbols.

24. The apparatus of claim 22, wherein the processor is further configured to:
associate a second media item with the first tag, the second media item being of a different media type than the first media item; and
responsive to the request from the media client, enable access to the first and second media items by enabling navigation according to the first tag.

25. The apparatus of claim 22, wherein: the first tag is evocative of a first real or perceived characteristic of the first media item, and wherein: the second tag is evocative of a second real or perceived characteristic of the first media item.

* * * * *